Patented Oct. 21, 1924.

1,512,299

UNITED STATES PATENT OFFICE.

JOSEPH A. NAGLE, OF COLUMBUS, OHIO, ASSIGNOR TO THE JEFFERY-DEWITT COMPANY, OF DETROIT, MICHIGAN, A CORPORATION OF MAINE.

TEMPORARY BINDER FOR CERAMIC BODIES.

No Drawing.          Application filed January 10, 1921.   Serial No. 436,384.

*To all whom it may concern:*

Be it known that I, JOSEPH A. NAGLE, a citizen of the United States, and a resident of Columbus, in the county of Franklin and State of Ohio, have made an invention appertaining to Temporary Binders for Ceramic Bodies; and I do hereby declare the following to be a full, clear, and exact description of the invention, such as will enable others skilled in the art to which it appertains to make and use the same.

My invention has for its object to provide an organic temporary binder for ceramic materials that is exceedingly efficient for maintaining the ingredients of raw batch compositions, while in a green state, in the forms in which they may be shaped. The temporary binders heretofore used for binding the ingredients of raw batch compositions are dextrine, starch, glue etc., but I have discovered that by the use of wheat flour, as a temporary binder compositions consisting largely of nonplastic ingredients may be more efficiently bonded together while in the green state than when the organic binders now commonly known in the art are used. Moreover, I have found that when flour is used as a binding agent, and the composition is dried by subjecting it to a warm humid atmosphere and then subsequently gradually reducing the humidity of the atmosphere and the body, that the flour is particularly efficient in binding or holding the composition in the shapes in which they may be formed. I also have discovered that flour when used as a temporary binder, will more efficiently bind highly refractory granular materials, such as silicon carbide, sillimanite and diaspore with a very little amount of clay, even though the clay is a nonplastic clay, and consequently compositions formed of such materials will be held in the shapes in which they are formed until the binder is burned out in the firing of the bodies formed of such compositions.

I have also discovered that the flour acts more efficiently than other organic binders known in the art when granular refractory materials having a large percentage of fines are incorporated in the batch composition, particularly when the amount of the clay used is insufficient to cover or cause adherence of the fines to each other while the body is in a green state and until the temperature of the body is raised to a point sufficient to burn out the organic binder. The flour will thus temporarily bind the finer particles of the refractory materials to each other and hold them together until the temperature of the body is raised to a point sufficient to cause a more or less coherence of the particles.

The amount of the flour used for temporarily binding the materials of the raw batch may be varied according to the firing conditions to which the materials are to be subjected and according to the plasticity of the permanent binder, that is, the plasticity of the clay incorporated in the raw batch. The amount of flour used for temporarily binding the ingredients of the raw batch may vary from a very minute amount to 8 per cent of the total ingredients of the raw batch.

The flour is preferably mixed with water to form a paste and the paste is added to the ingredients of the raw batch. Sufficient water is mixed with the flour while the flour is stirred to form a thin, creamy condition of the mixture and then steam is directed slowly into the mixture and preferably admitted at the bottom of the vessel containing the mixture. The flow of steam is permitted until the flour has expanded to substantially its maximum degree. If desired, a suitable preservative and a parasite poison may be added to the composition such as blue vitriol.

I claim:

1. A raw batch of ceramic bodies comprising a mixture of ceramic materials and cooked flour paste mixed with parasite poison.

2. A raw batch of ceramic bodies comprising a mixture of silicon carbide, sillimanite, diaspore, clay and flour paste.

In testimony whereof I have hereunto signed my name to this specification.

JOSEPH A. NAGLE.